Jan. 14, 1936.    M. SEIBT    2,027,455

CHECK VALVE

Filed Jan. 21, 1933

INVENTOR
MAX SEIBT
BY
Oscar A. Geier
ATTORNEY

Patented Jan. 14, 1936

2,027,455

UNITED STATES PATENT OFFICE 2,027,455

CHECK VALVE

Max Seibt, Dresden, Germany

Application January 21, 1933, Serial No. 652,877
In Germany January 25, 1932

4 Claims. (Cl. 251—124)

This invention relates to a check valve for pipings, especially in connection with centrifugal pumps.

It has already been proposed to employ dash pots in check valves for pipings to eliminate the rattle due to the opening and closing of the valves at fluctuations of pressure. It has further been proposed to overcome the slowness of motion of the valve due to the use of such means by connecting the cylinder with the pressure piping so as to have the piston act as a power piston.

According to the invention, these power pistons are used for a different purpose, namely, for opening or closing the check valve slowly like a pneumatic door closer in order to avoid in the pipings the much feared knocks caused by sudden opening and closing of the valve; the power piston is also used as a substitute for expensive remote control of the valve; or for a motor-driven device enabling the valve to open and close slowly.

The invention attains its objects by exposing the piston on the side of the cylinder and the rod to different piping pressures before and behind the valve, so that the differences in pressure will produce counter forces which have a braking effect during the opening and closing of the check valve. For this purpose the piston can be connected with the check valve in such a way that in overcoming a small opening or closing angle the path of the piston will be larger than while passing through the remaining angle. The braking effect can be increased during the opening and closing of the valve by providing the piston on the cylinder side with a closing or opening mandrel for the end of the connecting piping opening into the cylinder. To regulate the opening and closing speed of the valve a passage regulating device may be built into the connecting piping.

Figure 1:
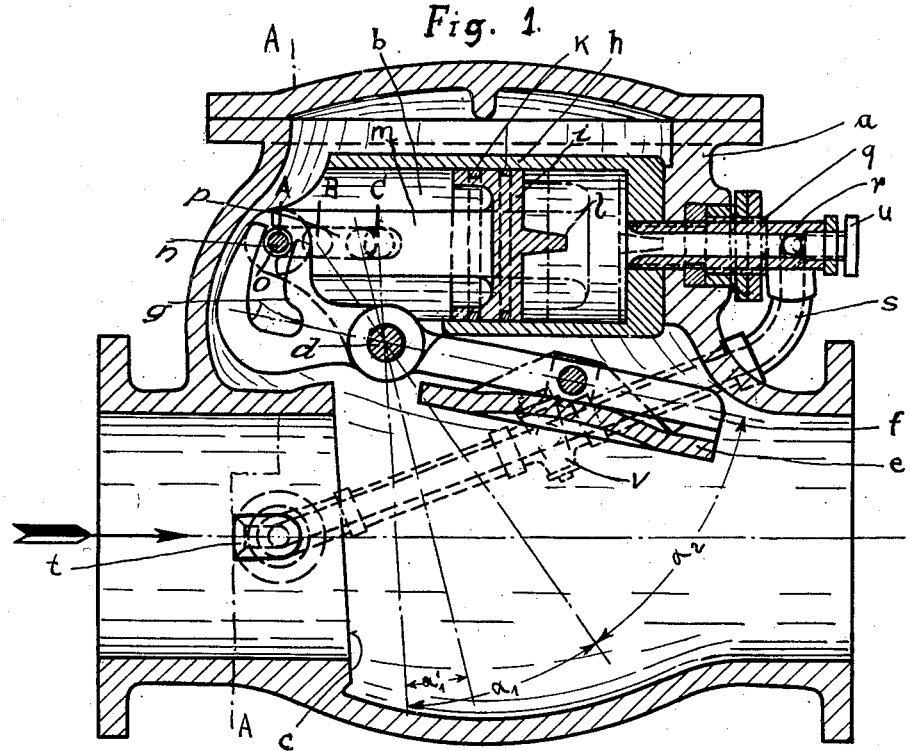
Figure 2:
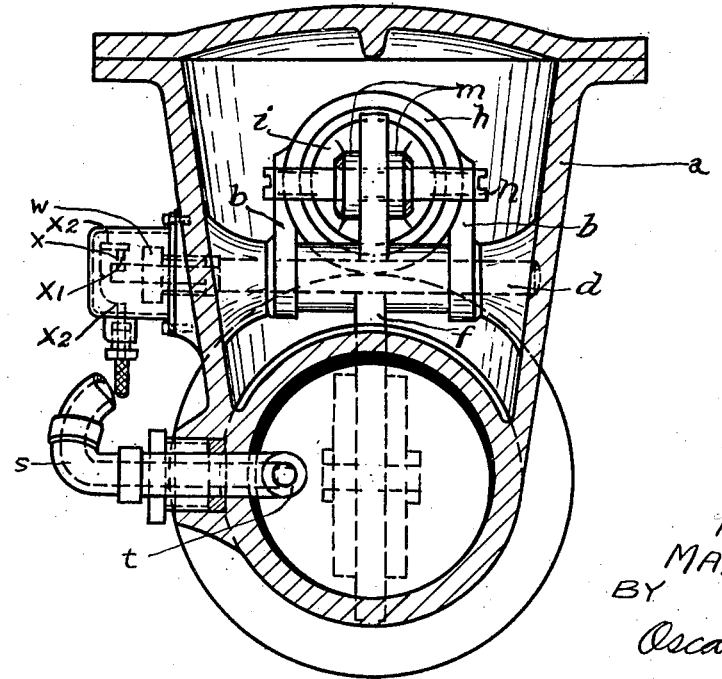

By way of example, one form of the invention is illustrated in the accompanying drawing, in which Figure 1 is a longitudinal section of a check valve fitting and Fig. 2, a cross section thereof on the line A—A, of Fig. 1.

In the casing $a$ the flap $e$ is disposed by means of the lever $f$ so as to be rotatable about the shaft $d$. If turned correspondingly, the flap $e$ will cover the seat surface $c$ and close the opening surrounded by the annular surface. The lever $f$ extends beyond the axis $d$ and forms a curved slot guide $g$ which engages a bolt $n$ attached to a divided piston rod $m$ which is connected with a piston $i$, the bolt $n$ being surrounded by a sleeve $o$ and being guided within a slide $p$ formed in the carrying arms $b$ of the cylinder $h$. By means of these arms $b$ the cylinder is held on one side on the pivot $d$ and on the other side on the fitting $a$. The outside of the cylinder $h$ and the piston rod side of the piston $i$ are subjected to pressure prevailing behind the flap $e$. The piston $i$ provided with rings $k$ and movable within the cylinder $h$ has on the cylinder side a pointed mandrel $l$ capable of fully entering the end of a pipe $r$ opening into the cylinder body. The pipe $r$ is passed by means of a stuffing box $g$ through the wall of the fitting $a$ and can be closed by a regulating device having the form of an adjusting screw $u$ for varying the sectional passage of the piping $s$. The first part of the pipe lies in front of the check valve or of the opening to be closed thereby, and is formed by a baffle member $t$. In the piping a three-way-cock $v$ is provided for draining the contents of the cylinder and testing the tightness of the piston $i$ on the one hand and testing the tightness of the flap on the annular face $c$ on the other. On the end of the pivot $d$ passing through a stuffing box $w$ a signal device $x$ is disposed, as shown in Fig. 2. The signal device $x$ comprises a lever $x_1$ rotatable along with the shaft $d$ and adapted to establish an electrical connection with a plurality of electrical contacts $x_2$ which are connected to a source of electrical energy not shown in the drawing.

In case of several check valves all of them may be interconnected by rods and act jointly on the braking piston.

The cylinder with the piston can of course be disposed outside the casing $a$.

The check valve arrangement according to the invention functions as follows:

When the flap $e$ is closed and pressure acts in the direction of the arrow, for example from a centrifugal pump, delivery would start quite suddenly in case of an undamped flap when the counter pressure behind the flap has been overcome. According to the invention, delivery begins, however, gradually, and for the following reasons:

When the flap is closed, the piston $i$ is in a position in which its mandrel $l$ completely closes the opening of the pipe $r$. If the flap $e$ begins to open, it tends to draw the piston $i$ out of the cylinder $h$ whereby a vacuum is produced by the piston $i$ on the cylinder side thereof, since the piston or its rod $m$ has to travel the large braking path C—B compared with the small opening angle $\alpha$ I and the contents of the piping, usually water, cannot follow quickly enough through the connecting pipe $s$ or the regulating device $u$. This effect is initially increased owing to the fact that the mandrel *l* closes the pipe *r* almost completely, then less and less during further opening and releases it entirely only after the opening angle α 1 has been attained. However, since behind the flap *e*, i. e., on the piston rod side, great pressure prevails, the piston has a braking effect on the opening, and to these different pressures the counter pressures are due.

When the opening angle α 1 has been attained, further opening up to the large angle α 2 can take place more quickly, and only the small braking path B—A is negotiated by the piston.

When the opening angle increases, the weight of the flap will make itself felt more and more as closing force so that a throttling effect could be produced thereby, which, however, is prevented by the development of overpressure in the member *t* in front of the flap *e* and thus in the cylinder *h* during the increased velocity of flow, while behind the flap *e* and on the rod side of the piston a vacuum is produced owing to the losses in flow. This difference between the two pressures represents a force which continually works against the closing force of the weight of the flap which is thus kept up and cannot have a throttling effect.

During opening, a braking force is first acting on the opening flap *e* through the connecting pipe *s* and by the piston, and this tractive force is converted during increasing pressure in the piping and piston into a pressure force which opens the flap more rapidly and keeps it open.

In case of the closing motion of the valve the pressure force working against the weight of the flap *e* changes into the opposite, for the reason that there prevails now overpressure on the piston rod side and vacuum on the cylinder side due to reversal of flow. The traction force resulting herefrom together with the weight of the flap causes rapid negotiation of the braking path A—B and thus rapid closing of the flap about the closing angle α 2, while the small closing angle α 1 requires again the larger braking path B—C. However, as simultaneously the pressure against the flap *e* and the pressure difference between pressure on the piston rod side and the vacuum on the member *t* or on the cylinder side increase, further closing of the flap goes on rapidly also until, in spite of increasing closing forces, energetic braking takes place at the beginning of the closing angle α 1' due to the fact that the mandrel *l* of the piston closes the pipe *r* more and more and thus produces high overpressure in the braking cylinder as a counter force. This closing process corresponds to normal operating conditions requiring quick closing and slow opening.

I claim:—

1. A check valve, particularly for driving centrifugal pumps, comprising a casing having an inlet and an outlet, a cylinder connected with said casing, a movable piston within said cylinder, an oscillatable flap adapted to close said inlet, means operatively connecting said flap with said piston, a pipe having one end connected to said casing adjacent to said inlet and another end leading into the interior of said cylinder, and a mandrel carried by said piston and adapted to close the second-mentioned end of said pipe.

2. A check valve, particularly for driving centrifugal pumps, comprising a casing having an inlet and an outlet, a cylinder connected with said casing, a movable piston within said cylinder, an oscillatable flap adapted to close said inlet, means operatively connecting said flap with said piston, a pipe having one end connected to said casing adjacent to said inlet and another end leading into the interior of said cylinder, a mandrel carried by said piston and adapted to close the second-mentioned end of said pipe and a regulating device connected with said pipe.

3. A check valve, particularly for driving centrifugal pumps, comprising a casing having an inlet and an outlet, a cylinder connected with said casing, a movable piston within said cylinder, an oscillatable flap adapted to close said inlet, means operatively connecting said flap with said piston, a pipe having one end connected to said casing adjacent to said inlet and another end leading into the interior of said cylinder, a mandrel carried by said piston and adapted to close the second-mentioned end of said pipe, a regulating device connected with said pipe, a baffle member on the first-mentioned end of said pipe, and a three-way-cock carried by said pipe between its first-mentioned end and said regulating device.

4. A check valve, particularly for centrifugal pumps, comprising a hollow casing having an inlet and an outlet, a cylinder connected with said casing, a movable piston within said cylinder, a flap situated within said casing between the inlet and the outlet, a lever having one end-portion connected with said flap and another end-portion having the shape of a curved slotted guide, said lever oscillating said flap between a closing position, in which said flap closes said inlet, and an open position, a pivot carried by said casing and oscillatably supporting said lever intermediate its two end-portions, a bolt engaging said slotted guide, a piston rod connected with said piston and carrying said bolt, and means connecting the inlet of said casing with one end of the cylinder, the travel of the piston being comparatively greater when said flap is adjacent to its closing position and being comparatively smaller when said flap is adjacent to its open position.

MAX SEIBT.